United States Patent [19]

Schmidt

[11] 4,228,397

[45] Oct. 14, 1980

[54] ELECTRONIC VELOCIMETER HAVING AN OSCILLATOR COUPLED COIL FOR MEASURING PROJECTILE MUZZLE VELOCITY

[75] Inventor: Jimmy Q. Schmidt, Baltimore, Md.

[73] Assignee: The United States of America as represented by the Secretary of the Army, Washington, D.C.

[21] Appl. No.: 959,542

[22] Filed: Nov. 13, 1978

[51] Int. Cl.³ ............................................. G01P 3/66
[52] U.S. Cl. .................................................. 324/179
[58] Field of Search ................... 324/178, 179; 346/38; 73/167

[56] References Cited

U.S. PATENT DOCUMENTS

| 2,301,194 | 11/1942 | Bradford | 324/179 X |
| 3,656,059 | 4/1972 | Overstreet | 324/179 X |
| 3,659,201 | 4/1972 | Vogelsang | 324/179 |
| 3,787,770 | 1/1974 | Cote et al. | 324/179 X |
| 3,824,463 | 7/1974 | Oehler | 324/179 |

*Primary Examiner*—Gerard R. Strecker
*Attorney, Agent, or Firm*—Nathan Edelberg; Max Yarmovsky

[57] ABSTRACT

An electronic velocimeter for measuring the muzzle velocity of a projectile employs a conductive coil mounted between the muzzle and an annular conductive shield. The shield and coil are insulated from each other and encircle the trajectory of the projectile. An oscillator means for generating an oscillator signal is coupled to the coil. This oscillator means is responsive to the projectile passing through the coil. A timing means responds to the oscillator to produce a timing signal. This timing signal represents the transit time for the projectile to traverse a predetermined interval of the trajectory of the projectile. Knowing this transit time the velocity is readily obtained.

10 Claims, 7 Drawing Figures

FIG. 5
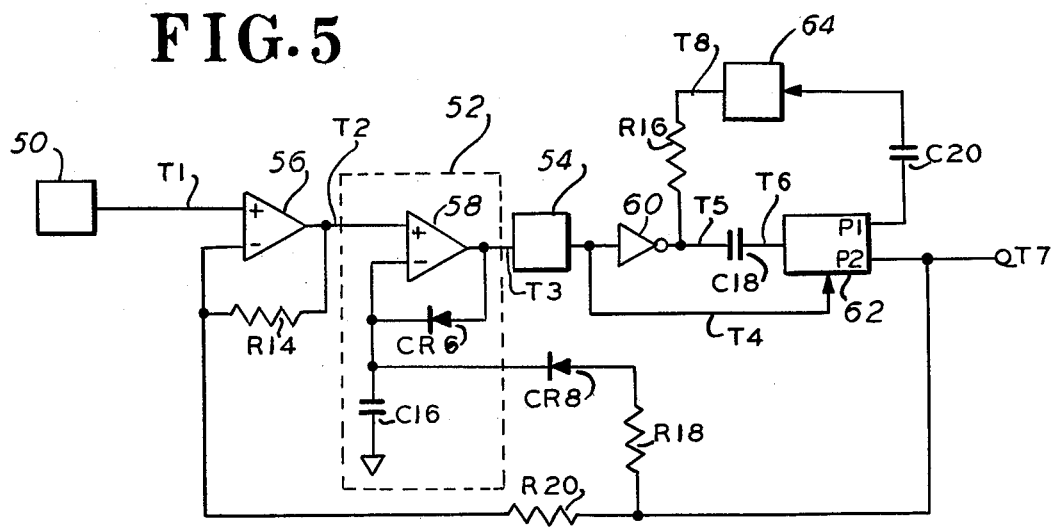
FIG. 4A
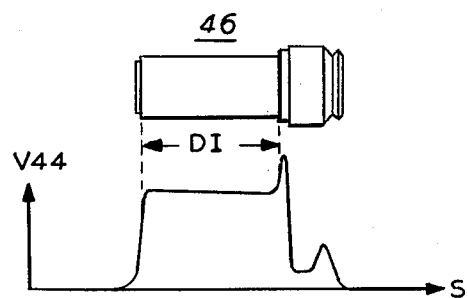
FIG. 4B
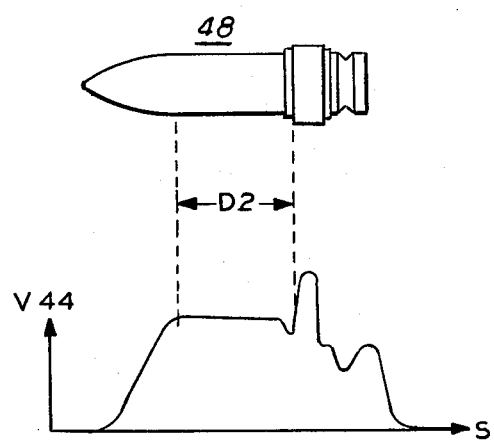
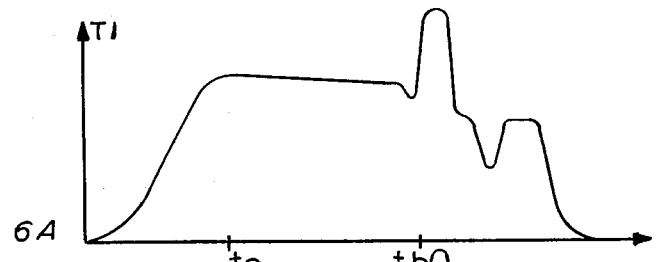
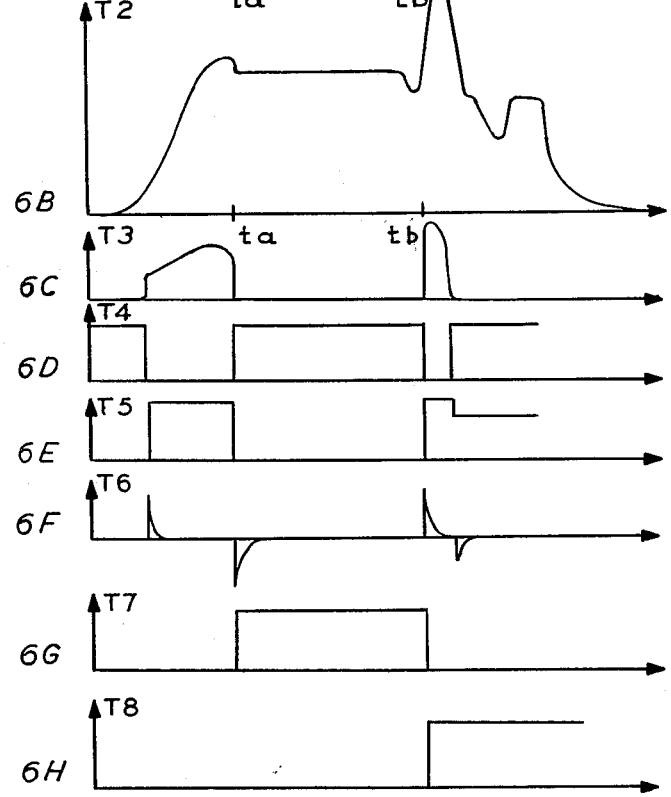
FIG. 6

1

ELECTRONIC VELOCIMETER HAVING AN OSCILLATOR COUPLED COIL FOR MEASURING PROJECTILE MUZZLE VELOCITY

GOVERNMENTAL INTEREST

The invention described herein may be manufactured, used and licensed by or for the Government for Governmental purposes without the payment to me of any royalties thereon.

BACKGROUND OF THE INVENTION

The present invention relates to electronic velocimeters and in particular to velocimeters employed to measure the muzzle velocity of a projectile.

The muzzle velocity of a projectile is a significant operating parameter of a weapon. Knowing the angle of elevation and muzzle velocity, the trajectory of a shell can be readily computed. A measurement of muzzle velocity can also be dispatched to an automatic gun control system to adjust gun elevation in response to variations in the muzzle velocity. In addition, a measurement of muzzle velocity can be a useful diagnostic tool for assessing barrel wear or projectile quality.

Known velocimeters have employed a magnetized projectile which is fired through a pair of spaced coils. Besides the special projectile which is required, the spacing between coils enlarges the device, making it cumbersome. Other known velocimeters substitute a light source and photocell for each of the above mentioned coils. While the latter system does not require a special projectile, the requisite spacing between photocells is still cumbersome. Microwave interferometers may be employed to measure muzzle velocity, however, such systems are relatively complicated and costly. In addition care must be taken to direct a microwave beam axially into the gun tube. This approach requires a system of reflectors and its performance is degraded by pointed projectiles which do not reflect microwave energy well. Another known velocimeter employs a spaced pair of strain or pressure gauges mounted on the gun tube which sense the strain caused by the passing projectile. This system is prone to false readings caused by acoustical or vibrational shock waves caused at the instant of firing. Also the strain on the gun tube lags the passage of the projectile to an extent which degrades accuracy.

The present invention measures velocity by measuring the transit time of a projectile through a coil. Since a pair of spaced coils is not required a simple and compact measurement system is provided which may be conveniently mounted on the muzzle, in some embodiments.

SUMMARY OF THE INVENTION

In accordance with illustrative embodiments demonstrating features and advantages of the present invention, there is provided in an electronic velocimeter for measuring the muzzle velocity of a projectile exiting from the muzzle of a weapon along a given trajectory, a sensor means. The sensor means includes an annular conductive shield mounted alongside and spaced from the muzzle. Also included is a conductive coil insulated from and mounted between the muzzle and the shield. The shield and the coil each encircle the trajectory of the projectile. The sensor means also includes an oscillator means for generating an oscillator signal. The oscillator means is coupled to the conductive coil and is responsive to passage of the projectile therethrough along a predetermined interval of the trajectory. Also included is a timing means responsive to the oscillator signal and operative to produce a timing signal. The timing signal represents the transit time for the projectile to traverse the predetermined interval of the trajectory. Thus the timing signal represents a quantity inversely proportional to the muzzle velocity.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein:

FIGS. 4A and 4B are elevational views of a projectile and its corresponding spatial signature;

FIG. 5 is a block diagram of an oscillator means and a timing means in accordance with the instant invention; and FIG. 6 is a series of timing diagrams showing signals at various terminals in FIG. 5.

DETAILED DESCRIPTION OF THE PREFERRED EMBODIMENT

Figure 1:
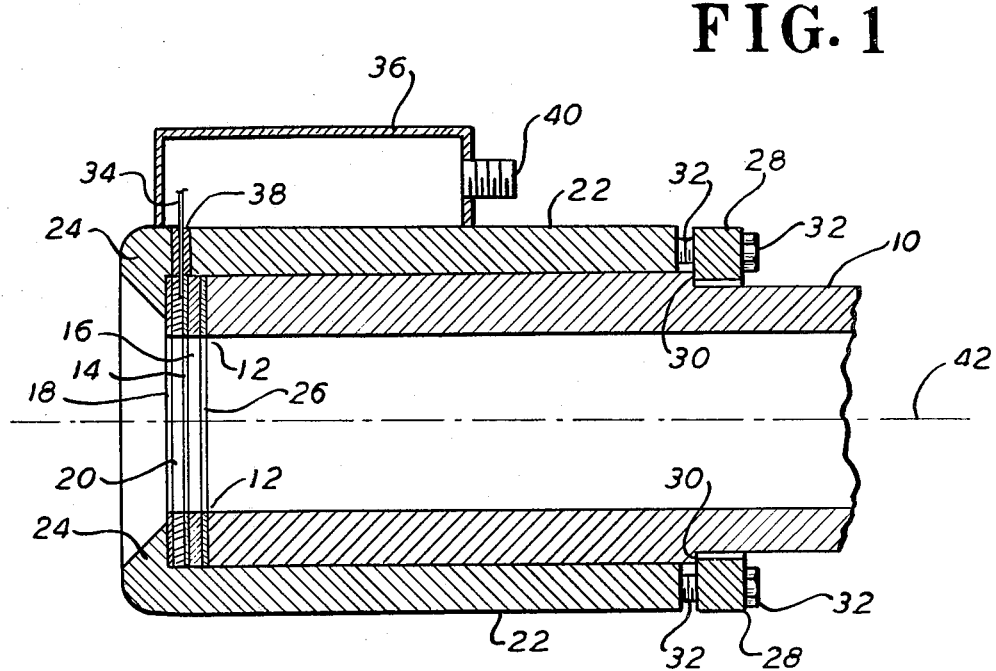
FIG. 1 is an elevational view in section showing the mechanical mounting of components of the instant invention.

Referring now specifically to the drawings, in FIG. 1, the barrel 10 of a weapon is shown in section and broken on the right. The muzzle 12 of barrel 10 has alongside it a conductive coil which is shown herein as annular conductive sheet 14 which is laminated onto an annular insulator 16. Coil 14 and insulator 16 are a convential printed circuit board composed of a fiberglass substrate with a copper laminate. It is understood that the thickness of coil 14 is exaggerated to clarify the illustration. Obviously many other arrangements are possible for coil 14 and insulator 16 such as a teflon annulus having a concentric groove on its side into which a wire or bus bar is embedded. Also, while coil 14 is shown herein as a single turn of conductive material, other embodiments may employ multi-turn coils.

Disposed alongside coil 14 is an annular conductive shield shown herein as an annular conductive sheet 18 adjacent to an annular insulating layer 20. Sheet 18 and layer 20 are fabricated from printed circuit board material consisting of copper-clad fiberglass. Copper sheet 18 provides an electrostatic shield for coil 14 although obviously many other conductive annular arrangements can provide shielding. Moreover, such shielding could be provided by a plurality of annularly disposed conductive elements in which adjacent elements are electrically isolated. Also for some embodiments a separate shield may not be employed and instead the mounting hardware may provide electrostatic shielding. In the embodiment shown herein a conductive tube 22 having an inwardly projecting shoulder 24 provides shielding and functions as mounting hardware. Shoulder 24 bears against the two printed circuit boards 18, 20 and 14, 16 and compresses them and annular gasket 26 onto muzzle 12. Gasket 26 prevents the leakage of high pressure gun gas which could damage or dislodge coil 14 or shield 18. Tube 22 is clamped onto muzzle 12 by means of split collar 28 which engages ridge 30. Split Collar 28 is a annulus formed of two complimentary semi-circular sections which draw tube 22 backwards by means of bolts 32.

Electrical leads 34 connect to coil 14 and pass through insulating bushing 38 into junction box 36. Bushing 38 is fitted into an aperture in tube 22. The contents of junction box 36 have not been illustrated for simplification purposes. In this embodiment an oscillator means is contained in box 36 and the balance of supporting circuitry is connected thereto by multi-pin connector 40. It is apparent, however, that the partitioning of circuitry within and without box 36 is a designer's choice.

In this embodiment barrel 10, tube 22, shoulder 24, shield 18, coil 14 and insulators 20, 16 and 26 are all coaxially mounted. Their axis coincides with trajectory 42 of the projectile (illustrated elsewhere). While this mounting is preferred it is contemplated other mounting arrangements may be employed.

Figure 2:
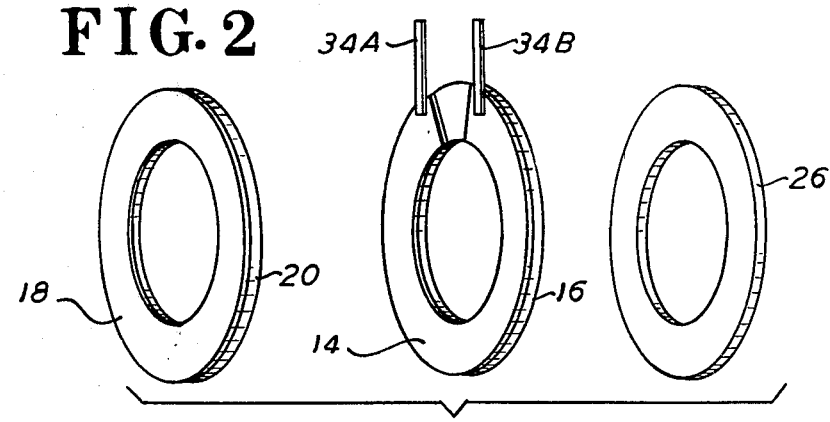
FIG. 2 is a perspective view of parts illustrated in FIG. 1.

Referring to FIG. 2, an exploded view of some of the components mounted in front of muzzle 12 of FIG. 1 are shown in perspective. The shield is shown herein as an annular substrate of fiberglass 20 having a copper sheet 18 laminated thereupon. As previously mentioned sheet 18 and substrate 20 are fabricated from conventional printed circuit board material. Similarly fabricated from printed circuit board material is coil 14 and insulator 16. Coil 14 is split and electrical leads 34A and 34B are soldered to different ends of coil 14 at this split. Such splitting may be accomplished by etching or by grinding coil 14. Leads 34A and 34B correspond to the leads designated as leads 34 in FIG. 1. Leads 34A and 34B may be formed of thin buss bar material.

Figure 3:
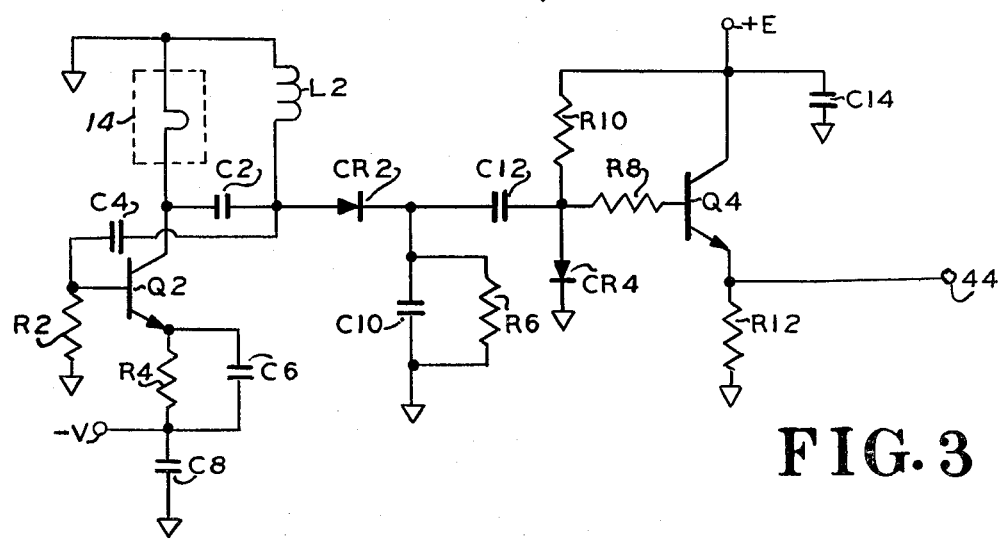
FIG. 3 is a partial schematic representation of an oscillator means in accordance with the instant invention.

Referring to FIG. 3, an oscillator means is shown as a Hartley oscillator employing NPN transistor Q2. Obviously many other sources of an oscillating signal may be used instead. Coil 14, which was illustrated in FIGS. 1 and 2 is shown schematically herein as coil 14. Coils 14 and L2 are connected together to a reference potential. While this reference potential is illustrated as ground, a fixed bias point differing in potential from other grounded terminals may be substituted here and elsewere. Connected to the ungrounded terminal of coil 14 is the collector of transistor Q2 and one terminal of capacitor C2, its other terminal being connected to the junction of the ungrounded terminal of coil L2 and one terminal of feedback capacitor C4. The other terminal of capacitor C4 is connected to the junction of the base of transistor Q2 and one terminal of bias resistor R2, whose other terminal is grounded. Emitter resistor R4 is connected to a negative supply potential at terminal −V. Capacitor C6 shunts oscillating signals across resistor R4. Supply filter capacitor C8 is connected between terminal −V and ground. Arranged in this fashion a 12 MHz signal is provided across coil L2 whose amplitude varies with the losses of coil 14. The losses of coil 14 increase as a projectile approaches and loads coil 14. Accordingly, the amplitude of oscillation across coil L2 decreases as a projectile passes through coil 14.

This amplitude modulated signal is fed to an amplitude detector shown herein as serially connected diode CR2 and capacitor C10, serially connected between ground and the junction of capacitor C2 and L2. Resistor R6 and capacitor C10 are connected in parallel between ground and the cathode of diode CR2. In operation, capacitor C10 is charged to a voltage corresponding to the amplitude of oscillation across coil L2.

The detected voltage is capacitively coupled to an emitter follower amplifier by capacitor C12. This amplifier comprising NPN transistor Q4, has its base resistively coupled (resistor R8) to the junction of biasing resistor R10 and biasing diode CR4 which are serially connected between the positive supply potential at terminal +E and ground. Diode CR4 has its cathode grounded and its anode connected to the junction of capacitor C12 and resistors R8 and R10. Transistor Q4, whose collector is connected to supply terminal +E and supply filter capacitor C14, employs grounded emitter resistor R12. The output at terminal 44 is connected to the emitter of transistor Q4.

It is appreciated that the output signal on terminal 44 is a voltage that varies as a function of the position of a projectile with respect to coil 14. Referring to FIG. 4A, projectile 46 is shown with its axis parallel to the abscissa S of a graph. This graph displays the voltage on terminal 44 (FIG. 3) as ordinate V44. The abscissa S represents the axial position of projectile 46 which is encircled by coil 14 (FIG. 1). Abscissa S is scaled to coincide with the illustrated projectile 46 such that lines parallel to ordinate V44 intercept an axial position on projectile 46 and its corresponding coordinate on abscissa S. The plot of FIG. 4A is referred to as the signature of projectile 46.

The specific signature produced will depend upon the diametric and compositional variations occurring along the axis of a projectile. Projectile 46 is relatively blunt so that its signature has a steep rise and fall. Referring to FIG. 4B, projectile 48 has a pointed forward end which causes a comparatively gentle rise in the signature. The signature of projectile 48 is plotted against abscissa S and ordinate V44, which are arranged and scaled in the same manner as the graph of FIG. 4A.

Referring to FIG. 5, a block diagram is shown of a timing means coupled to an oscillator means 50. In this embodiment oscillator 50 is identical to the circuit shown in FIG. 3. The timing means includes peak means 52 which drives a threshold means 54. As will become clear peak means 52 need not be employed in all embodiments but is useful for processing the signature of a pointed projectile. Peak means 52 provides a signal responsive to the magnitude of the output of oscillator 50 exceeding its prior peak value. While other known arrangements can provide such a function, peak means 52 employs a unidirectional conducting device CR6 serially connected with a capacitive element C16.

The output of oscillator 50 is coupled to diode CR6 by a coupling means shown herein as amplifier 56. Amplifier 56 is cascaded with amplifier 58. The non-inverting inputs of amplifiers 56 and 58 are separately connected to the outputs of oscillator 50 and amplifier 56, respectively. Amplifier 56 has a negative feedback resistor R14 connected around it to establish a stable and moderate gain. Capacitor C16 has one terminal grounded and its other terminal connected to the junction of the cathode of diode CR6 and the inverting input of amplifier 58. The output of amplifier 58 is connected to the anode of diode CR6.

In operation, amplifier 58 will forward bias diode CR6 and charge capacitor C16 if the charge thereon does not exceed the voltage applied to the non-inverting terminal of amplifier 58. Accordingly, capacitor C16 operates as a peak detector. The output of amplifier 58 will rise whenever capacitor C16 is charging and will fall otherwise. In effect the output of amplifier 58 will fall whenever the rate of change of the output of amplifier 56 is zero or negative.

Threshold means 54 is a device which produces a high or a low signal depending upon whether or not its input exceeds a predetermined threshold value. In a constructed embodiment, threshold device 54 employed a bistable multivibrator, although obviously circuits such as a comparator or a schmitt trigger may be employed instead.

The output of devive 54 drives a logic means and a hold means shown herein as monostable multivibrators 62 and 64, respectively. The output T4 of device 54 is connected to the input of inverter 60 and the reset input of monostable multivibrator 62. The output of inverter 60 is coupled through capacitor C18 to the trigger input of monostable multivibrator 62. Multivibrator 62 has two outputs P1 and P2 which are in phase. Output P1 is coupled through capacitor C20 to the trigger input of multivibrator 64, whose output is connected to the output of inverter 60 through resistor R16. The durations of the unstable high states of multivibrators 62 and 64 are relatively long in comparison to the time required for a projectile to pass through coil 14 (FIG. 1). The output P2 is connected to output terminal T7 and the junction of resistors R18 and R20. Resistor R20, being connected between output P2 and the inverting input of amplifier 56, can reduce the system sensitivity to the signal on line T1, as explained hereinafter. Diode CR8, having its cathode connected to the inverting input of amplifier 58, provides a form of positive feedback. Diode CR8 and resistor R18 are serially connected between terminal T7 and the inverting input of amplifier 58.

To facilitate an understanding of the foregoing equipment, its operation will be briefly described as a projectile such as projectile 48 (FIG. 4B) is fired past coil 14 (FIG. 1). Prior to entry of a projectile into coil 14 (FIG. 1) oscillator 50 (FIG. 5) produces a constant low (zero volts) signal which is transferred from line T1 to T3. In this quiescent condition monostable multivibrator 62 is in its stable state and produces a low signal on terminal T7. As projectile 48 (FIG. 4B) approaches coil 14 (FIG. 1) the output of oscillator 50 (FIG. 5) begins increasing, causing a positive voltage to appear at the output of amplifier 58, for the reasons previously given. In response, threshold device 54 produces a low signal which causes inverter 60 to produce a high (5 volts) signal. Also, the positive voltage on line T3 forward biases diode CR6 and charges capacitor C16.

The output of oscillator 50 continues to rise as shown in the timing diagram 6A (FIG. 6) until at time ta it reaches a plateau. Since at time ta the voltage on lines T1 and T2 stops increasing, the output of amplifier 58 (FIG. 5) falls to zero. This event corresponds to the constant diameter portion of projectile 48 (FIG. 4B) entering within coil 14 (FIG. 1). The falling voltage on line T3 causes threshold device 54 to produce a high signal on line T4 and an inverted low signal on line T5. These signals on lines T3, T4 and T5 are shown in timing diagrams 6C, 6D and 6E (FIG. 6), respectively. The voltage fall on line T5 couples a negative-going trigger through capacitor C18 to multivibrator 62, causing it to produce on its outputs P1 and P2 and on terminal T7 a high signal. The waveforms appearing on lines T6 and T7 are shown in timing diagrams 6F and 6G (FIG. 6), respectively. The foregoing conditions persist as the constant diameter portion of the projectile 48 (FIG. 4B) passes through coil 14 (FIG. 1).

As the rear of projectile 48 (FIG. 4B) enters coil 14 (FIG. 1) a diametrically larger portion is presented to the coil. As a result, the output of oscillator 50 (FIG. 5) rapidly increases. This rapid increase is shown occurring around time tb in timing diagram 6A (FIG. 6). This increase causes amplifier 58 to produce a positive signal which drives threshold device 54 so it produces a low signal on line T4. The low signal on line T4 prematurely resets monostable multivibrator 62 causing it to produce a low signal at terminal T7. Also the in-phase output P1 couples a negative going pulse to monostable multivibrator 64 causing it to produce a high signal on line T8 as shown in timing diagram 6H (FIG. 6). The high signal on line T8 biases line T5 for a predetermined interval so that subsequent transients do not retrigger multivibrator 62. Such transients can be produced as a result of the output of amplifier 58 returning to zero or from ionized gun gas escaping past coil 14 (FIG. 1) after projectile 48 is launched.

It is apparent that the pulse produced on terminal T7 by the foregoing process has a duration equivalent to the time elapsing as a predetermined projectile length passes a fixed station at the muzzle. This predetermined projectile length is illustrated as dimension D2 in FIG. 4B. Muzzle velocity is the ratio of dimension D2 to the pulse duration at terminal T7. Accordingly this pulse duration is a quantity that is inversely proportional to muzzle velocity. The signal at terminal T7 may be dispatched to well-known computing circuitry to provide a direct display of muzzle velocity.

It is also apparent that peak means 52 (FIG. 5) will respond to the constant diameter portion of a projectile so that accurate velocity readings may be obtained from blunt or pointed projectile. So long as the time of passage of the constant diameter portion of the projectile does not exceed the free running time of the multivibrator (62), projectiles of different lengths and configurations may be fired without any circuit changes. Only a change in the baseline length for different length projectiles would have to be considered in the computation of muzzle velocity.

Overall accuracy will be a function of the interspacing of muzzle 12, coil 14 and shield 18 (FIG. 1). If they are relatively close, the accuracy will be correspondingly high.

To prevent false triggering, the positive output on terminal T7 is fed back to amplifiers 56 and 58. This positive output applied to the inverting input of amplifier 56 reduces its output during the constant diameter phase of operation. This renders the system relatively insensitive to noise and allows the system to respond to a large rise in voltage such as that occurring at time tb, as shown in timing diagram 6A (FIG. 6). This reduction in sensitivity is manifested by the voltage depression on line T2 of FIG. 5 as shown in timing diagram 6B (FIG. 6). This effect is further enhanced by the positive voltage fed to capacitor C16 (FIG. 5) by diode CR8. This cuts off amplifier 58 further so it responds only to a substantial rise in the voltage at line T2.

It is also appreciated that after firing of a projectile capacitor C16 will retain a residual charge which will inherently dissipate at a rate depending on the dielectric and insulating qualities of that capacitor and the time constant of the parallel circuit. In some embodiments in which a weapon is rapidly fired it may be necessary to directly discharge capacitor C16 by means of a transistor switch or other suitable device. Such details and variations are clearly within the skill of this art.

The foregoing embodiments may also be varied dimensionally to satisfy the accuracy and noise immunity requirements of a specific installation. Moreover, many alternate circuits may be devised to provide the functions needed to measure muzzle velocity. Obviously many other modifications and variations of the present invention are possible in light of the above teachings. It is therefore to be understood that within the scope of the appended claims, the invention may be practiced otherwise than as specifically described.

What is claimed is:

1. In an electronic velocimeter for measuring muzzle velocity of a projectile exiting the muzzle of a weapon along a given trajectory, comprising: sensor means which includes;
    an annular conductive shield axially aligned in front of and spaced from said muzzle;
    a conductive coil insulated from and operatively mounted between said muzzle and said annular conductive shield, said conductive shield and said conductive coil each concentrically encircling said trajectory;
   oscillator means electrically coupled to said conductive coil, for generating electromagnetic radiations from said conductive oil, said oscillator means being inductively responsive to passage therethrough of said projectile, for producing localized eddy currents on a metallic surface of said projectile as said projectile moves through said conductive coil, said eddy currents inducing secondary electromagnetic fields which cause a loss due to change in impedance transformations of said conductive coil and modulates the amplitude of an output signal of said oscillator means to be proportional to the geometric shape of said projectile;
   timing means for shaping the amplitude of said output signal of said oscillator means and operatively connected for producing a timing signal representing the transit time for said projectile to pass through said sensor means, said timing signal varying inversely proportional to the length of said projectile divided by said projectile muzzle velocity, which includes;
      logic means for producing a single output pulse having a leading edge which coincides in time with a first point on said projectile as said projectile passes said sensor means and a trailing edge coinciding in time with passage of a second point on said projectile passing said sensor means.

2. In an electronic velocimeter according to claim 1 wherein the amplitude of said oscillator signal is modulated by the passage of said projectile through said conductive coil.

3. In an electronic velocimeter according to claim 1 further comprising:
   an annular insulator concentrically mounted between said conductive coil and said muzzle.

4. In an electronic velocimeter according to claim 2 wherein said timing means comprises:
   a threshold means for producing a threshold signal in response to the magnitude of said oscillator signal exceeding a predetermined amount.

5. In an electronic velocimeter according to claim 2 wherein said timing means comprises:
   peak means for producing a peaking signal responsive to the magnitude of said oscillator signal exceeding its prior peak value, the magnitude of said peaking signal being less than a given value in response to recession of the magnitude of said oscillator signal below its prior peak value.

6. In an electronic velocimeter according to claim 5 wherein said peak means comprises:
   a capacitive element; and
   a unidirectional conducting device serially connected to said capacitive element, said unidirectional device being coupled to said oscillator means to charge said capacitive element in response to said oscillator signal exceeding in magnitude its prior peak value.

7. In an electronic velocimeter according to claim 1 wherein said annular conductive shield comprises:
   a conductive tube having an inwardly projecting shoulder on one end, said conductive tube being coaxially mounted around said muzzle, said shoulder projecting in front of said muzzle, said conductive coil being disposed between said shoulder and said muzzle.

8. In an electronic velocimeter according to claim 7 wherein said annular conductive shield comprises:
   an annular conductive sheet coaxially disposed between said shoulder and said conductive coil; and
   an annular insulating layer coaxially disposed between said annular conductive sheet and said conductive coil.

9. In an electronic velocimeter according to claim 5 wherein said timing means further comprises:
   logic means having a first and second state, said logic means transferring from said first to said second state in response to the magnitude of said peaking signal receding from said given value, said logic means returning to said first state in response to said peaking signal exceeding said given value; and
   hold means for maintaining said logic means in said first state for a predetermined time period after said logic means returns from said second state to said first state.

10. In an electronic velocimeter according to claim 9 wherein said oscillator means includes:
    an oscillator tuned by said conductive coil;
    an amplitude detector coupled to said oscillator to produce a detected signal; an
    coupling means for coupling said detected signal to said peak means, said coupling means operative to reduce the magnitude of said detected signal in response to said logic means transferring to said second state.

* * * * *